No. 735,636. PATENTED AUG. 4, 1903.
O. WHITMORE.
BRAKE BLOCK.
APPLICATION FILED JULY 19, 1900.
NO MODEL.
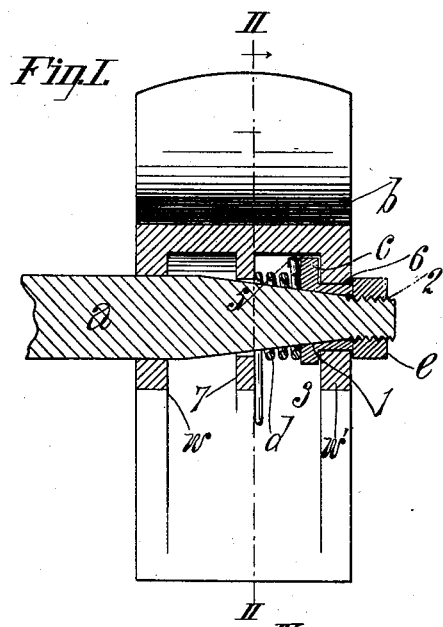
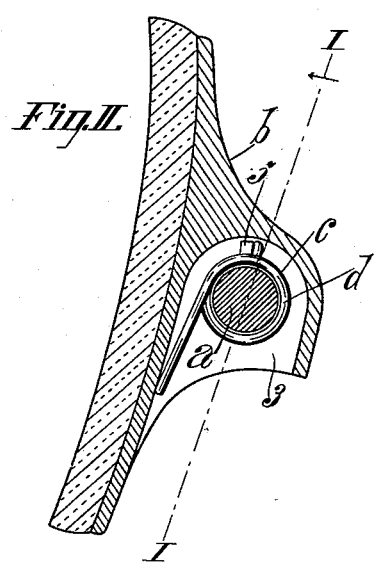
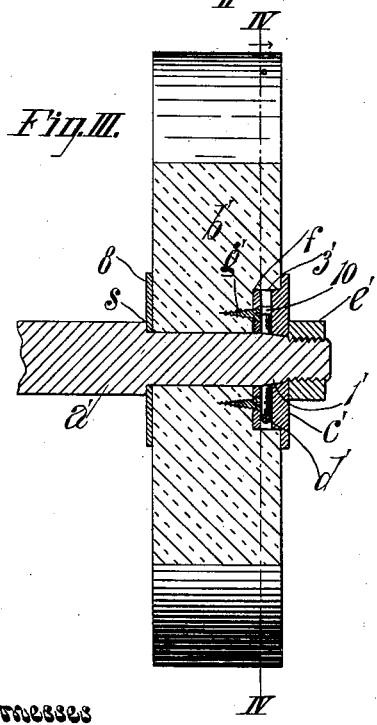
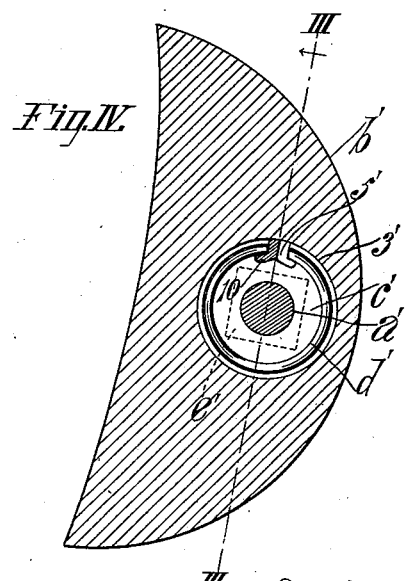
Witnesses
Inventor
Oscar Whitmore
by Townsend Bro.
his attys.

No. 735,636. Patented August 4, 1903.

UNITED STATES PATENT OFFICE.

OSCAR WHITMORE, OF SAN DIEGO, CALIFORNIA.

BRAKE-BLOCK.

SPECIFICATION forming part of Letters Patent No. 735,636, dated August 4, 1903.

Application filed July 19, 1900. Serial No. 24,239. (No model.)

*To all whom it may concern:*

Be it known that I, OSCAR WHITMORE, a citizen of the United States, residing at San Diego, in the county of San Diego and State of California, have invented a new and useful Improvement in Brake-Blocks, of which the following is a specification.

The object of this invention is to provide superior means for automatically turning the brake-block to throw the top thereof away from the wheel when the brake is released.

It is the object of my invention to simplify the construction and increase the facility of adjustment of the brake-block to a desired position and the block-throwing spring to a desired tension.

The invention is applicable in various forms.

The accompanying drawings illustrate my invention in two modes of its application.

Figure I is a sectional view of my invention in one form of its application. Line I I, Fig. II, indicates the line of section. Fig. II is a section on line II II, Fig. I. Fig. III is a sectional view of another form of my invention as applied to a wooden brake-block. Line III III, Fig. IV, indicates the line of section. Fig. IV is a sectional view on the line IV IV of Fig. III.

In Figs. I and II, $a$ indicates the brake-shaft furnished with a taper portion 1 and a screw-threaded portion 2. $b$ indicates a brake-block to turn on said shaft and furnished with a chamber 3 about the taper portion. $c$ indicates a washer furnished with a spring-retainer 5 and chambered in the chamber and also furnished with a projection 6, which extends through the wall of the chamber toward the end of the shaft to form a journal for the block. $d$ indicates a spring in the chamber, interposed between the spring-retainer 5 and the block $b$ to throw the block. $e$ indicates a nut outside of the chamber, screwed onto the shaft and engaging the projection 6 of the washer to force the washer onto the taper. The walls $w\ w'$ of the block are respectively journaled on the shaft and on the projection 6. 7 indicates a lug inside the block to hold the spring in position, so that it will not be withdrawn from the spring-retainer 5 of the washer $c$.

In Fig. III the block $b'$ may be of wood. The shaft $a'$ is shouldered at $s$ to prevent the block from moving inward. 8 indicates a washer between the block $b'$ and the shoulder $s$. $f$ indicates a plate fastened to the block by screws $g$. 3' indicates a recess in the block to receive the plate $f$, which is provided with a spring-retainer 10. $c'$ indicates a washer to fit the taper 1' of the shaft and seated in the recess or chamber 3', in which is mounted the spring $d'$, which is an open ring, the ends of which are spread apart and rest against the spring-retainers 5' and 10 to normally hold them together. $e'$ indicates the nut screwed upon the shaft to force the washer $c'$ onto the tapered portion of the shaft.

In practical use the block will be adjusted to operative position by loosening the nut $e\ e'$, turning the block into the position in which it is normally to stand, and then firmly screwing the nut $e\ e'$, as the case may be, into place. The taper portion of the shaft wedges the washer and prevents it from turning. The spring will then normally throw the block in the position to which it is thus adjusted. When the brake-block is brought against the wheel, the upper portion thereof will engage the wheel and throw the block against the tension of the spring to bring the block fully against the wheel. When the brake is released, the spring again turns the block into its retracted position.

What I claim, and desire to secure by Letters Patent of the United States, is—

1. The combination of a brake-shaft furnished with a taper portion; a brake-block to turn on said shaft; a washer fitted on the taper portion of the shaft and furnished with a spring-retainer; a spring interposed between the retainer and the block; and a nut screwed on the shaft to force the washer onto the taper, and to hold the block in place.

2. The combination of a brake-shaft furnished with a taper portion; a brake-block to turn on said shaft and furnished with a chamber about the taper portion; a washer furnished with a spring-retainer and chambered in the chamber and fitted on the taper portion of the shaft; a spring in said chamber interposed between the retainer and the block; and a nut screwed on the shaft to force the washer onto the taper and to hold the block in place.

3. The combination of a brake-shaft furnished with a taper portion; a brake-block to turn on said shaft and furnished with a chamber about the taper portion; a washer furnished with a spring-retainer and chambered in the chamber and also furnished with a projection which extends through the wall of the chamber, toward the end of the shaft to form a journal for the block; a spring in the chamber interposed between the spring-retainer and the block to throw the block; and a nut outside the chamber screwed onto the shaft and engaging the projection of the washer to force the washer onto the taper.

4. The combination of a brake-shaft furnished with a taper portion and a screw-threaded portion; a brake-block to turn on said shaft and furnished with a chamber about the taper portion; a washer seated in the chamber and fitting the taper portion; a nut outside the chamber and screwed upon the shaft to force the washer onto the taper and to hold the block in place; and a spring constructed to turn the block and held by the washer from turning on the shaft.

5. The combination of a brake-shaft furnished with a taper portion and a screw-threaded portion; a brake-block to turn on the shaft and furnished with a chamber about the taper portion; a spring in said chamber; a washer seated in the chamber and fitting the taper portion and furnished with a spring-retainer and with a projection extending through the wall of the chamber toward the end of the shaft; portions of the block being journaled on the shaft and on the projection; and a lug inside the block to prevent the withdrawal of the spring from the spring-retainer.

In testimony whereof I have signed this specification, in the presence of two witnesses, at San Diego, California, this 12th day of July, 1900.

OSCAR WHITMORE.

Witnesses:
J. C. HIZAR,
W. H. PRINGLE.